United States Patent
Hassouneh et al.

(10) Patent No.: US 11,415,707 B1
(45) Date of Patent: Aug. 16, 2022

(54) MINIATURIZED MULTI-BAND SPACE GNSS RECEIVER

(71) Applicant: United States of America as represented by the Administrator of NASA, Washington, DC (US)

(72) Inventors: Munther Hassouneh, Greenbelt, MD (US); Luke Winternitz, Greenbelt, MD (US); Samuel R. Price, Greenbelt, MD (US); Luke J. Thomas, Greenbelt, MD (US); Jason Mitchell, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/038,366

(22) Filed: Sep. 30, 2020

(51) Int. Cl.
| G01S 19/39 | (2010.01) |
| G01S 19/07 | (2010.01) |
| G01S 19/42 | (2010.01) |

(52) U.S. Cl.
CPC .......... *G01S 19/393* (2019.08); *G01S 19/071* (2019.08); *G01S 19/42* (2013.01); *G01S 19/421* (2013.01); *G01S 19/423* (2013.01)

(58) Field of Classification Search
CPC ...... G01S 19/393; G01S 19/071; G01S 19/42; G01S 19/421; G01S 19/423
See application file for complete search history.

(56) References Cited

U.S. PATENT DOCUMENTS

| 6,859,170 | B2 * | 2/2005 | Devereux | G01S 19/37 |
| | | | | 342/357.29 |
| 2011/0261805 | A1 * | 10/2011 | Landry | G01S 19/24 |
| | | | | 370/342 |
| 2013/0021934 | A1 * | 1/2013 | Rugamer | G01S 19/32 |
| | | | | 370/252 |
| 2013/0271318 | A1 * | 10/2013 | Doucet | G01S 19/44 |
| | | | | 342/357.64 |
| 2015/0247730 | A1 * | 9/2015 | Calmettes | B64G 1/007 |
| | | | | 701/468 |
| 2015/0301191 | A1 * | 10/2015 | Wallace | G01S 19/43 |
| | | | | 342/357.42 |
| 2016/0011318 | A1 * | 1/2016 | Cohen | G01S 19/425 |
| | | | | 342/357.26 |
| 2017/0082755 | A1 * | 3/2017 | Thomas | G01S 19/37 |
| 2017/0276792 | A1 * | 9/2017 | Gao | G01S 19/08 |
| 2017/0350985 | A1 * | 12/2017 | Agee | G01S 19/215 |
| 2018/0095156 | A1 * | 4/2018 | Katz | G01S 19/17 |

* cited by examiner

*Primary Examiner* — Thomas M Hammond, III
(74) *Attorney, Agent, or Firm* — Matthew F. Johnston; Bryan A. Geurts; Helen M. Galus

(57) ABSTRACT

A space based multi-band GPS/GNSS navigation system, including: a first RF card with a space grade application specific integrated circuit (ASIC) implementing two RF channels configured to receive and process two different received navigation signals; a space grade navigation processor configured to: execute processor instructions to process the two different received navigation signals to produce position, velocity, and time information; and process measurements using an Extended Kalman filter for enhanced performance at high altitude, including cis-lunar and lunar space.

16 Claims, 2 Drawing Sheets

MINIATURIZED MULTI-BAND SPACE GNSS RECEIVER

ORIGIN OF THE INVENTION

The invention described herein was made by employees of the United States Government, and may be manufactured and used by or for the Government for Government purposes without the payment of any royalties thereon or therefore.

TECHNICAL FIELD

Example embodiments disclosed herein relate generally to a miniaturized multi-band GNSS receiver for space navigation, including high altitude and lunar applications.

BACKGROUND

The use of GPS/GNSS for space navigation in high altitude regimes beyond low-earth orbit (LEO) is more challenging due to degraded signal strength, availability, and geometry. Still, the cost and performance benefits of GNSS remain highly desirable for users in these regimes. NASA and its partners have a long and successful history of policy and receiver technology development efforts aimed at enabling high-altitude GNSS applications. Some notable missions now using GPS beyond LEO include the Geostationary Operational Environmental Satellite (GOES)-16 and 17 missions, and the record-setting Magnetospheric Multiscale (MMS) mission that has demonstrated excellent onboard GPS-based navigation in a highly elliptical orbit with a current apogee of 29 RE (~50% of the lunar distance). The MMS mission uses GPS receiver technology that is a predecessor to the presently described technology. These advances and operational demonstrations point to a new frontier for high-altitude GPS/GNSS in cis-lunar and lunar regimes, which the present technology specially targets.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a space based multi-band GPS/GNSS navigation system, including a first RF card with a space grade application specific integrated circuit (ASIC) implementing two RF channels configured to receive and process two different received navigation signals; a space grade navigation processor configured to: execute processor instructions to process the two different received navigation signals to produce position, velocity, and time information; and process measurements using a Kalman filter.

Various embodiments are described, further including a second RF card with an application specific integrated circuit (ASIC) implementing two additional RF channels configured to receive and process two additional different received navigation signals.

Various embodiments are described, wherein the two RF channels and the two additional RF channels are phase synchronized.

Various embodiments are described, wherein the first RF card is configured to process GPS navigation signals and the second RF card processes Galileo navigation signals.

Various embodiments are described, wherein the first RF card has a bandwidth of at least 20 MHz.

Various embodiments are described, wherein the first RF card is configured to receive a subset of GPS L1C/A, GPS L1C, GPS L2C, GPS L5, Galileo E1, Galileo, and E5a signals.

Various embodiments are described, wherein the two different navigation signals are from two different satellite constellations.

Various embodiments are described, wherein the two RF channels are phase synchronized.

Various embodiments are described, wherein the navigation system configured to operate in high altitude Earth orbit (above LEO) and process mainlobe and sidelobes transmissions from the different navigation signals.

Various embodiments are described, wherein the system (antenna, front-end, firmware and software, and clock) configured to operate in cis-lunar space and at and around the Moon and process mainlobe and sidelobes transmissions from the different navigation signals.

Various embodiments are described, wherein navigation processor is configured to be reprogrammed after the navigation system is deployed in space.

Various embodiments are described, wherein the navigation processor is further configured to combine measurements from the two different navigation signals.

Various embodiments are described, wherein the Kalman filter is configured to process additional measurement types.

Various embodiments are described, wherein the additional measurement types include one of range and/or bearing from optical cameras or LIDAR, X-ray pulsar measurements, and ground station and/or crosslink Dopplers and/or range.

Various embodiments are described, wherein navigation processor is further configured to produce position, velocity, and time information based upon the Kalman filter in situations with poor geometry or restricted visibility.

Various embodiments are described, wherein the navigation processor is configured to use signal acquisition and tracking thresholds as low as 25 dB-Hz.

Various embodiments are described, wherein the navigation processor is configured to have a time to first fix of less than about 300 seconds when cold and less than about 120 seconds when warm in a weak signal environment.

Various embodiments are described, further comprising an atomic clock connected to the navigation processor.

Various embodiments are described, further comprising a pulse per second system configured to produce a pulse per second signal based upon a least squares algorithm.

Various embodiments are described, wherein producing position, velocity, and time information further includes producing a pulse per second signal based on the output from the Kalman filter.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

To facilitate understanding, identical reference numerals have been used to designate elements having substantially the same or similar structure and/or substantially the same or similar function.

DETAILED DESCRIPTION

Figure 1:
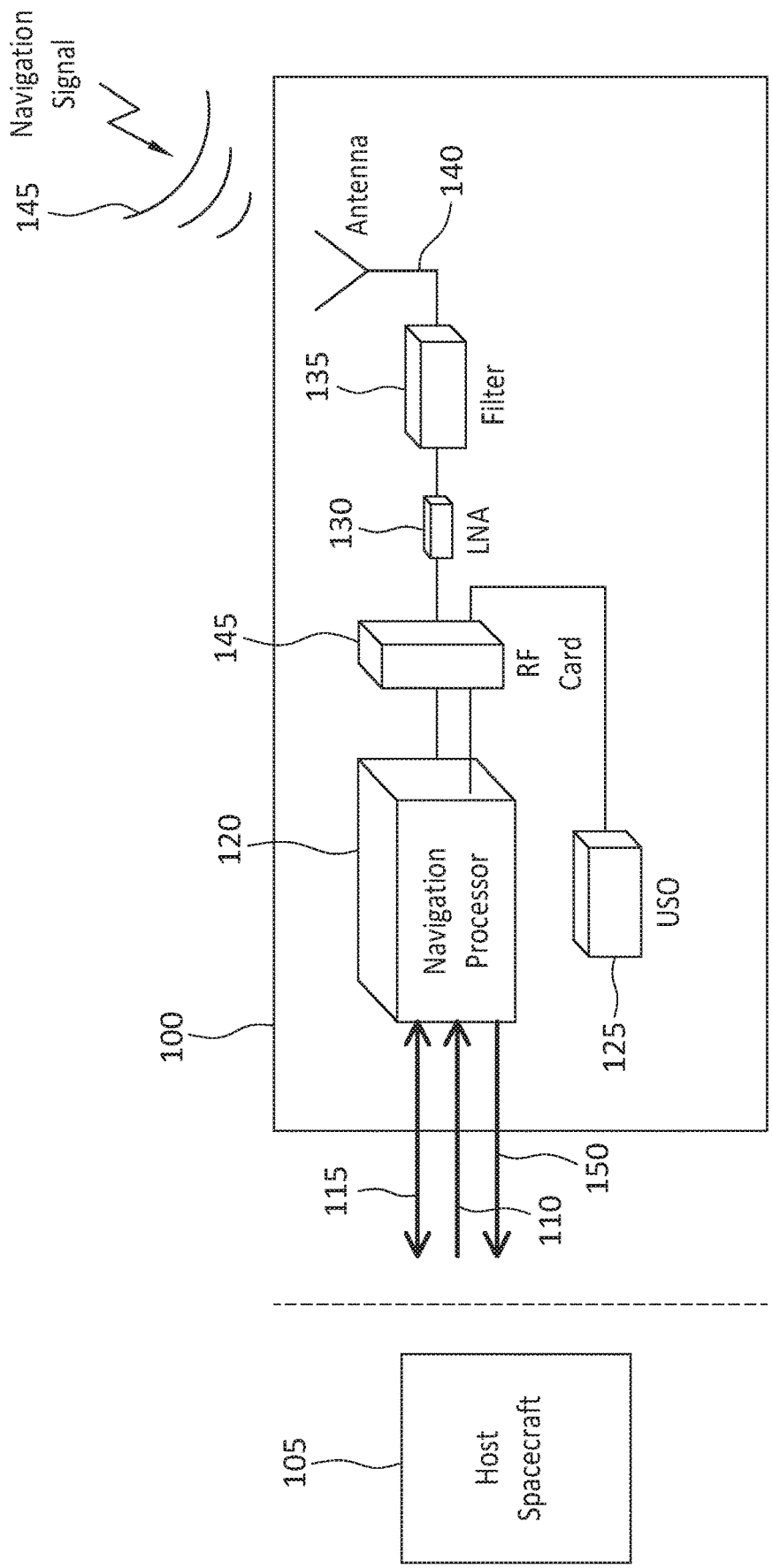
FIG. 1 illustrates a miniaturized navigation system for HEO and lunar applications.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Embodiments of a new miniaturized high-altitude capable, reprogrammable, space Global Navigation Satellite System/Global Positioning System (GNSS/GPS) receiver platform is described herein. While GPS is used as an example navigation system/protocol, other navigation systems/protocols may also be used.

This new embodiment of the navigation system is a further improvement on the NASA NavCube 2.0 navigation system. That system was a dual frequency system based on a discrete component, Radio Frequency (RF) front-end downconversion card that was limited to processing two signals. The current miniaturized navigation system uses an application specific integrated circuit (ASIC) that is capable receiving and processing a wider variety of navigation signals from various navigation satellite constellations. Because of the use of the ASIC in the receiver, the resulting navigation system is reduced in size, weight, and power.

The new GPS receiver architecture described here derives from flight-proven prior GPS receiver technology and has the following capabilities. The miniaturized navigation system is space qualified radiation tolerant design. The miniaturized navigation system uses a multi-frequency, wide-band (at least 20 MHz around each center frequency) front-end RF card, based on a radiation hardened ASIC chipset capable of processing modernized GPS signals as well as other GNSS signals. The RF card may be configurable for, i) GPS L1/Galileo E1 and GPS L2C, ii) GPS L1/Galileo E1 and GPS L5/Galileo E5a, iii) GPS L1/Galileo E1 and GPS L1/Galileo E1, as well as other similar navigation signals. The two RF chains on the RF card are phase synchronized. The navigation system receiver supports more than one RF card for applications where more than two frequency bands are needed or for applications that require redundancy. The navigation receiver also supports frequency and phase synchronization of different RF chains. The RF card supports an on-board reference oscillator or an external reference oscillator depending on mission requirements.

The miniaturized navigation receiver targets applications in all orbit regimes, including LEO, geostationary Earth orbit (GEO), and high Earth orbit (HEO) GPS navigation applications, and especially cis-lunar (defined here as the space between GEO and the Moon) and lunar space. The navigation receiver may be used in a full range of missions and may be coupled with different processing systems that may be available on the target vehicles. Further, the miniaturized navigation receiver allows for easy reprogramming of firmware and software on-orbit.

FIG. 1 illustrates a miniaturized navigation system for HEO and lunar applications. The navigation system 100 includes an antenna 140, a filter 135, an low noise amplifier (LNA) 130, one or more RF cards 145, a navigation processor 120, a reference oscillator (RO) 125. The navigation system 100 is hosted on and interacts with a host spacecraft 105. The navigation system 100 may receive power from 110 from the host spacecraft. The navigation system is a high-altitude dual frequency GPS receiver with a powerful weak-signal acquisition engine that allows it to acquire and track sidelobe signals (at least as low as 25 dB-Hz) with no a-priori knowledge. As the firmware and software is improved, lower and lower sidelobe levels will be detectable. The receiver includes a wideband, multifrequency ASIC chipset on an RF card that is radiation hardened and is capable of processing modernized GPS signals as well as other GNSS signals. The two RF chains of the receiver may be phase synchronized. The navigation receiver may also support more than one RF card for applications where more than two frequency bands are needed or for applications that require redundancy. The receiver also supports frequency and phase synchronization of different RF chains.

The navigation system 100 may track two different navigation signals, e.g., any of the GPS L1 (C/A), GPS L2C, GPS L5, GPS L1C, Galileo E5a, and Galileo E1 signals, but other signals may be tracked instead because of the wideband capabilities of the ASIC based receiver. Further, the tracked signals may be from different satellite constellation. The use of these two different frequency bands include the following benefits: the ability to measure and/or correct ionospheric delays; greater reliability and accuracy; the modernized signals signal have a modernized message with additional information such as Earth orientation parameters and allows for autonomous operations with less ground updates; some modernized signals have pilot channels that may allow for enhanced tracking; the RF card may be configured to track GPS L5 and Galileo E5a in addition to GPS L1 C/A or L1C and Galileo E1; and multi-constellation capability improves signal availability in high altitude applications. These benefits lead to improved accuracy and robustness.

The navigation processor 120 may run the Goddard Enhanced Onboard Navigation System (GEONS) Extended Kalman Filter (EKF) flight software. The navigation processor 120 may produce a point, velocity, and time (PVT) solution. Further, the navigation processor 120 may be a NASA SpaceCube 3.0 Mini processor, NASA SpaceCube 2.0 processor, or any other available processor. The navigation receiver 100 supports fast-acquisition for rapid recovery after re-entry radio blackout. For example the time to first fix may be for a strong signal environment: less than about 40 seconds cold (dominated by the ephemeris decode); less than about 6 seconds warm (dominated by subframe synchronization); and less than 1 second reacquisition (zero a-priori time to just reacquire code phase, Doppler in acquisition search). For example, the time to first fix may be for a weak signal environment may be less than about 300 seconds cold and less than about 120 seconds warm.

The RO 125 may be an ultra-stable crystal oscillator. In other embodiments that require increased accuracy, the RO 125 may be implemented using a space atomic clock. Atomic clocks are commercially-available products with a rich heritage that includes numerous units flying on various missions.

The antenna 140 receives a navigation signal 145, which in this example is a GPS signal, but could be other types of navigation signals as discussed above. A filter 135 filters the received signal so that only frequency bands of interest are received. The filter 135 may be a cavity bandpass filter tuned to pass the navigation signal frequencies of interest. The LNA 130 amplifies the filtered signal. The RF card 145 receives the signal from the LNA 130 and produces a digital output representing the input signal to the navigation processor 120. The RF card 145 supports two RF chains as described above. It also supports an onboard reference clock such as the RO 125 or an external reference clock for more frequency stability demanding applications, e.g., high altitude, cislunar (defined here to be the space between GEO and lunar space), and lunar applications. The RF card 145 is attached to the navigation processor 120 platform running specialized GPS firmware and software capable of receiving the various navigation signals that may be received by the RF card 145. The RF front-end card 145 applies the appropriate gain, downconverts the GPS RF signal to a baseband or low-IF signal, and digitizes this signal with an onboard analog to digital converter (ADC). The ADC samples are then sent to the navigation processor 120 which uses the data to produces a GPS navigation solution. Additional navigation cards may be included in the miniaturized system to provide the capability to receive and process additional navigation signals in parallel.

The antenna 145 may comprise an Earth-pointed high-gain GPS antenna sized appropriately to provide adequate gain. The antenna 145 may be a multi-band GPS/GNSS antenna. The antenna is selected to provide adequate gain to compensate for the RF free space losses resulting from a lunar orbit. This gain may be achieved with a small diameter dish or multi-element array mounted on an Earth-pointed gimbal. The antenna needs a field of view that is wide enough to encompass the current GPS constellation, which subtends about 8° at lunar distances. In other embodiments the antenna field of view may be greater than 8°.

The previous NASA high altitude flight GPS system used four different FPGAs that are pre-programmed to carry out acquisition, FFT, track, and communication and it was a single frequency system capable of tracking GPS L1 C/A signal only. It was not reprogrammable and therefore did not allow for on-orbit firmware or software updates. The firmware design was tightly coupled to the hardware and was not extensible nor reprogrammable.

In the NASA NavCube 2.0, the navigation processor is a processor that implements each of these functions on a single radiation tolerant, reprogrammable FPGA chip. The reprogrammable FPGA chip is a Virtex 5QV SIRF FPGA allowing for on-orbit firmware updates. Further, other navigation and processing functions are implemented on a MicroBlaze soft processor. Because the navigation processor [120] software program memory is programmable, the software implementing the navigation functions using navigation signals may be updated during flight.

The processor architecture has been further improved in the current embodiment to allow for easy portability between different FPGA devices and extensibility to receive new GNSS signals. The reprogrammable FPGA chip may be a Kintex UntraScale FPGA chip. Also the firmware for the miniaturized navigation receiver evolved from the NavCube 2.0 version with additional capabilities added as needed to support full utilization of additional capabilities in the miniaturized navigation receiver, e.g., wide bandwidth. Using full bandwidth of navigation signals results in improved navigation accuracy.

The firmware implements an L1 C/A acquisition algorithm that uses a Fast Fourier Transform (FFT)-based fast acquisition process for quickly searching across the code and doppler space for a particular navigation satellite signal. The algorithm utilizes off-chip DRAM for storing short coherent and long term non-coherent correlations for acquiring weak signals.

The current firmware design implements multiple L1 C/A and L2C tracking channels to be able to track signals from multiple navigation satellites. Each L1 C/A tracking channel is coupled with an L2C tracking channel to enable the L2C signal to be acquired based off of the L1 C/A doppler and code phase. The tracking channels are constructed in a modular fashion to allow for re-use of functions that are common to any tracking channel regardless of signal type. The number of tracking channels is extensible and only limited by the available processing resources in the FPGA and the soft processor. The firmware is designed to be easily extensible to receive other GNSS signals (e.g., GPS L1C, L5, Galileo E1, Galileo E5a) and easily portable to other processing platforms.

In addition, the firmware of the miniaturized navigation system implements an ASIC SPI-like (serial peripheral interface) control logic to configure the front-end ASICs, an L1 C/A acquisition algorithm, L1 C/A and L2C tracking loops, and soft processor to run the embedded GPS software. The firmware configures the ASIC parameters to receive the desired GNSS signals based on the center frequency and the bandwidth of the signal.

The RF card 145 is an ASIC-based GPS/GNSS RF downconversion card. The RF card 145 is wide band with at least 20 MHz bandwidth around each center frequency. Examples of possible configurations for the RF chains are:

Chain 1: GPS L1/Galileo E1, chain 2: GPS L2C

Chain 1: GPS L1/Galileo E1, chain 2: GPS L5/Galileo E5a

Chain 1: GPS L1/Galileo E1, chain 2: GPS L1/Galileo E1

The RF card 145 also supports an onboard reference clock or an external reference clock for applications where higher frequency stability is required, including for example applications with low GNSS visibility (e.g., fewer than four signals typically available) and/or poor geometry such as high altitude, cislunar, and lunar applications. The RF card 145 is attached to the navigation processor 120 running a specialized GPS firmware and software capable of receiving the GPS L1 C/A and L2C signals. The RF front-end card 145 amplifies, downconverts, and filters the GPS RF signal to baseband signal, and digitizes the baseband signal with an onboard analog to digital converter (ADC). The ADC samples are then sent to the FPGA on the processor card which uses the data to produce a GPS navigation solution. The navigation receiver supports more than two RF chains by using more than one RF card where all the chains are phase and frequency synchronized.

Figure 2:
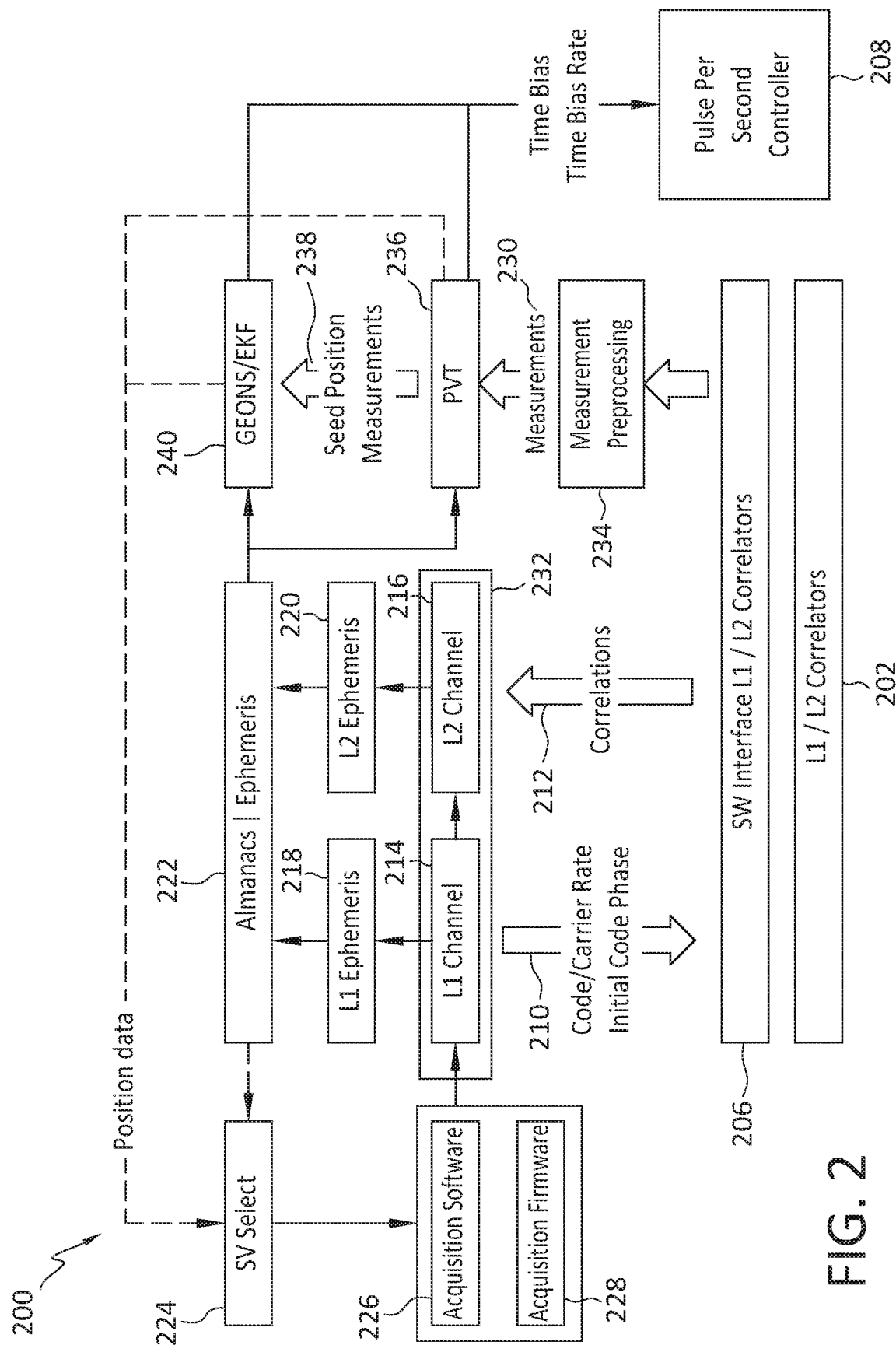
FIG. 2 illustrates a flow diagram of the different threaded tasks of the navigation processing.

FIG. 2 illustrates a flow diagram of the different threaded tasks of the navigation processing. The software for the miniaturized navigation system evolved from the NavCube 2.0 version with additional capabilities added as needed to support full utilization of additional capabilities in the miniaturized navigation system, e.g., wide bandwidth. Using wide bandwidth enables the use of new navigation signals and improved performance in processing legacy narrow-band navigation signals.

Upon startup, the space vehicle (SV) select task 224 begins by commanding the acquisition task 226 where various GPS satellites to be acquired. Acquisition processes uses firmware 228 or software 228 to implement this function. Successful acquisitions are used to start L1 tracking channels 214, i.e., tracking the L1 signals transmitted by the acquired GPS satellites. Unsuccessful acquisitions may be determined by low correlation strengths. The SV task 224 also monitors and determines if a GPS satellite is already being tracked by monitoring the current tracking channels 214. The L1 GPS tracking channels 214 are used to start L2 tracking channels 216. Again, the channels are shown as processing the GPS L1 C/A and L2C signals, but as discussed above other signals may be processed in the channels.

For the L1 channels, the channels may be run at 1, 2, 4, 5, 10, or 20 millisecond correlator update rates. Fast Fourier transforms (FFTs) are used for carrier pull-ins to estimate the carrier frequency and to start a phase-locked loop. The L1 channel may be used to seed the L2 channel using the doppler/code phase information from the current L1 tracking information.

For the L2C channels, medium/long correlations may be kept separate until used in correlator update. The medium code data bits may be decoded using a lookup table, or a Viterbi decoder. Also, the medium/long correlations are combined at the correlation update rate. Ambiguity of medium correlation due to data bits may be resolved by comparing the medium/long prompt correlations prior to combining.

The Ephemeris task 222 receives raw transmitted data from L1/L2 channels 218, 220 and decodes and stores the data. The Ephemeris task also serves a role in fault detection by monitoring and flagging errors in decoded ephemerides and identification of satellites. This may involve cross-checking between ephemerides and almanacs, and validity checking of transmitted data which is adapted for strong and weak signals. The ephemeris task furthermore manages ephemeris requests and returns the most precise valid data for a requested time in a standardized format where the data includes the various Ephemeris and Almanac data. While the L1 channel 214 and L2 channel 216 are shown, these two channels may also process other types of navigation signals as described above.

Correlators 202 receive the various GPS signals and correlate the signals using specific codes associated with codes unique to each GPS satellite in order to determine a time of arrival. The software interface 206 provide the data from the correlators via channel interface 232 to the L1 channel 214, and the L2 channel 216, and measurements 230 to the Position, Velocity, Time (PVT) task 236. Measurements may be combined from L1/L2/L5 channels to enhance the receiver performance, including measuring and/or correcting ionospheric delays. The tracking channels 214, 216 may be monitored to determine if measurements are from channels with decaying signal strength. When channels decay below a threshold level those channels may be dropped. Measurements 230 may be filtered/averaged/smoothed prior to providing the measurements to the PVT task 236 and the GEONS task 236 by using optional measurement preprocessing 234. The PVT task 236 receives measurements and calculates position, velocity, time, time bias, time bias rate using least squares algorithm. Measurements with high residuals may be removed from the solution, and PVT may be recalculated after removal of measurements if needed. Other performance metrics may be used to validate/invalidate the solution. Validation checks may be performed on doppler/velocity residuals. The PVT output may be sent to the SV select task. The PVT output may also be used to seed position measurements 238 in the GEONS/EKF task 240.

GEONS is a navigation software package using an Extended Kalman Filter (EKF) that supports enhanced navigation especially critical for high-altitude applications, and GEONS outputs may be used to enhance the performance of the receiver basic functions. The GEONS/EKF task 240 is started with an initial position and measurement data. The GEONS/EKF task 240 propagates position, velocity, time solutions, and corrects state/velocity with measurements data. The GEONS task 240 calculates covariance information related to estimated state error. The GEONS task 240 is able to provide position/velocity/time information when less than four satellites are tracked. When state information from the PVT task 240 is available a comparison state is produced for validation of the GEONS/PVT state. An initial state may be uploaded from the ground that may be provided to the GEONS/EKF task 240 in situations where a point solution may not be possible (e.g., the number of GPS tracked satellites<4).

In addition to processing GPS measurements, GEONS 240 may process accelerations from an external source during maneuvers and may process external measurement sources to improve navigation and timing performance. Additional external measurements may include, but are not limited to: range and/or bearing from optical cameras or LIDAR, X-ray pulsar measurements, ground station and/or crosslink Doppler and/or range, etc.

The SV select task 224 is provided with position/time information from either the PVT 236 or GEONS/EKF 240, and GPS almanac data from Ephemeris task 222. This information may be used to reduce the doppler search space for weak acquisitions.

The SV select task 224 may determine the GPS acquisition selection order. This may involve obtaining state data from PVT/GEONS, and predicting the visibility and Doppler frequency of each untracked, visible GPS signal, which may be used to limit the signal number and Doppler search space in the commands sent by the SV select task to the acquisition task 226.

Time solutions from PVT 236 or GEONS/EKF 240 are provided to the Pulse Per Second task 208. The Pulse Per Second task 209 produces the receiver's one Pulse Per Second (1PPS) output.

Embedded applications may be dependent upon processor hardware firmware to handle CPU intensive tasks including but not limited to correlations, and acquisition, but the algorithms implemented in firmware may also be implemented in software. The navigation system may be run either with or without firmware.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A space based multi-band GPS/GNSS navigation system, comprising:
   a first radiation hardened RF card with an application specific integrated circuit (ASIC) implementing two RF channels configured to receive and process two different received navigation signals:
   a second radiation hardened RF card with an application specific integrated circuit (ASIC) implementing two additional RF channels configured to receive and process two additional different received navigation signals; wherein the two radiation hardened RF channels and the two additional RF channels are phase synchronized;
   a radiation hardened reprogrammable navigation processor configured to:
   execute processor instructions to process the two different received navigation signals and two additional different received navigation signals to produce position, velocity, and time information; and
   process measurements using a Kalman filter; wherein
   wherein the navigation system is configured to operate in high altitude Earth orbit (above LEO) and process mainlobe and sidelobes transmissions from the different navigation signals and configured to be reprogramed to facilitate on orbit firmware updates.

2. The navigation system of claim 1, wherein the first RF card is configured to process GPS navigation signals and the second RF card processes Galileo navigation signals.

3. The navigation system of claim 1, wherein the first RF card has a bandwidth of at least 20 MHz.

4. The navigation system of claim 1, wherein the first RF card is configured to receive a subset of GPS L1C/A, GPS L1C, GPS L2C, GPS L5, Galileo E1, Galileo, and E5a signals.

5. The navigation system of claim 1, wherein the two different navigation signals are from two different satellite constellations.

6. The navigation system of claim 1, wherein the two RF channels are phase synchronized.

7. The navigation system of claim 1, wherein the system is additionally configured to operate in cis-lunar space and at and around the Moon and process mainlobe and sidelobes transmissions from the different navigation signals.

8. The navigation system of claim 1, wherein navigation processor is configured to be reprogrammed after the navigation system is deployed in space.

9. The navigation system of claim 1, wherein the navigation processor is further configured to combine measurements from the two different navigation signals.

10. The navigation system of claim 1, wherein the Kalman filter is configured to process additional measurement types.

11. The navigation system of claim 10, wherein the additional measurement types include one of range and/or bearing from optical cameras or LIDAR, X-ray pulsar measurements, and ground station and/or crosslink Dopplers and/or range.

12. The navigation system of claim 1, wherein the navigation processor is configured to use signal acquisition and tracking thresholds as low as 25 dB-Hz.

13. The navigation system of claim 1, wherein the navigation processor is configured to have a time to first fix of less than about 300 seconds when cold and less than 120 seconds when warm in a weak signal environment.

14. The navigation system of claim 1, further comprising an atomic clock connected to the navigation processor.

15. The navigation system of claim 1, further comprising a pulse per second system configured to produce a pulse per second signal based upon a least squares algorithm.

16. The navigation system of claim 1, wherein producing position, velocity, and time information further includes producing a pulse per second signal based on the output from the Kalman filter.

* * * * *